(12) United States Patent
Paranjpe et al.

(10) Patent No.: US 11,365,981 B2
(45) Date of Patent: Jun. 21, 2022

(54) SYSTEMS AND METHODS OF GENERATING COMPOSITE ROUTING MAPS

(71) Applicant: GoBrands, Inc., Philadelphia, PA (US)

(72) Inventors: Rohan Paranjpe, San Francisco, CA (US); Billy Chen, San Francisco, CA (US); Somchaya Liemhetcharat, Fremont, CA (US)

(73) Assignee: GoBrands, Inc., Philadelphia, PA (US)

( * ) Notice: Subject to any disclaimer, the term of this patent is extended or adjusted under 35 U.S.C. 154(b) by 0 days.

(21) Appl. No.: 16/935,019

(22) Filed: Jul. 21, 2020

(65) Prior Publication Data

US 2020/0348145 A1 Nov. 5, 2020

Related U.S. Application Data

(63) Continuation of application No. PCT/US2020/028125, filed on Apr. 14, 2020.
(60) Provisional application No. 62/834,898, filed on Apr. 16, 2019.

(51) Int. Cl.
*G01C 21/36* (2006.01)
*B60W 60/00* (2020.01)
*G01C 21/34* (2006.01)

(52) U.S. Cl.
CPC ......... *G01C 21/367* (2013.01); *B60W 60/001* (2020.02); *G01C 21/3453* (2013.01); *G01C 21/3605* (2013.01); *G01C 21/3676* (2013.01)

(58) Field of Classification Search
CPC .............. G01C 21/367; G01C 21/3453; G01C 21/3605; G01C 21/3676; G01C 21/3815; G01C 21/3841; B60W 60/001

USPC .......................................................... 701/533
See application file for complete search history.

(56) References Cited

U.S. PATENT DOCUMENTS

| 10,969,232 | B1* | 4/2021 | Johnson ............... G01C 21/367 |
| 2007/0014488 | A1 | 1/2007 | Chen et al. |
| 2011/0141138 | A1 | 6/2011 | Geelen et al. |
| 2011/0301843 | A1 | 12/2011 | Gale et al. |
| 2013/0030692 | A1* | 1/2013 | Hagan ..................... G06F 16/29 701/410 |
| 2014/0132608 | A1 | 5/2014 | Mund et al. |

(Continued)

OTHER PUBLICATIONS

Rideos Inc., International Search Report and Written Opinion, PCTUS2020028125, dated Jul. 2, 2020, 21 pgs.

*Primary Examiner* — Paula L Schneider
(74) *Attorney, Agent, or Firm* — Duane Morris LLP

(57) ABSTRACT

Systems and methods for generating a composite map are provided. In one aspect, a method is provided that includes identifying a first node and a source node on a first map. The method further includes determining a candidate source node on a second map that corresponds to the source node on the first map. The method further includes determining a plurality of candidate nodes on the second map that potentially correspond to the first node and selecting a respective candidate node from the plurality of candidate nodes based on a similarity of a routing distance between: the respective candidate node and the candidate source node on the second map and the first node and the source node on the first map. The method may also include connecting the selected respective candidate node and the first node and combining the first map and the second map into a composite map.

19 Claims, 13 Drawing Sheets

(56) References Cited

U.S. PATENT DOCUMENTS

| | | |
|---|---|---|
| 2016/0307348 A1 | 10/2016 | Yang et al. |
| 2017/0219364 A1 | 8/2017 | Lathrop et al. |
| 2020/0018604 A1* | 1/2020 | Zhang ................ G06K 9/00818 |

* cited by examiner

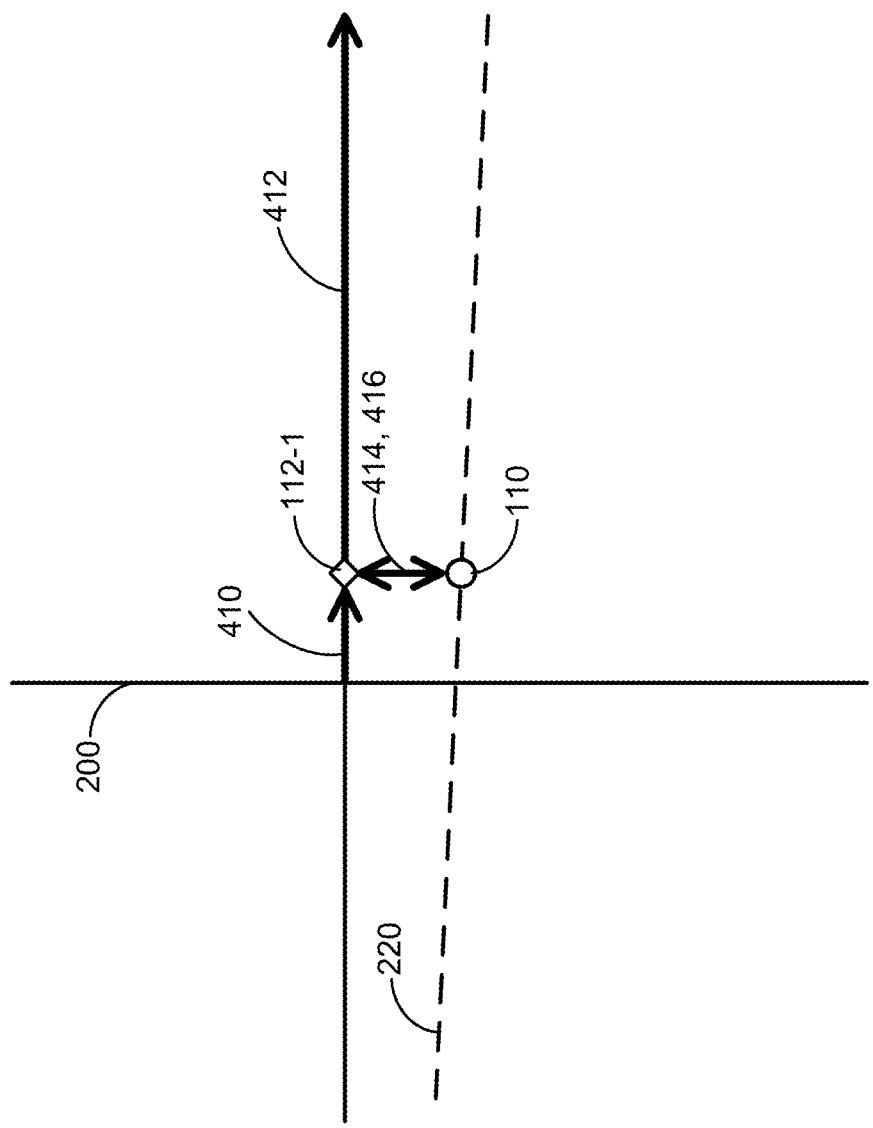

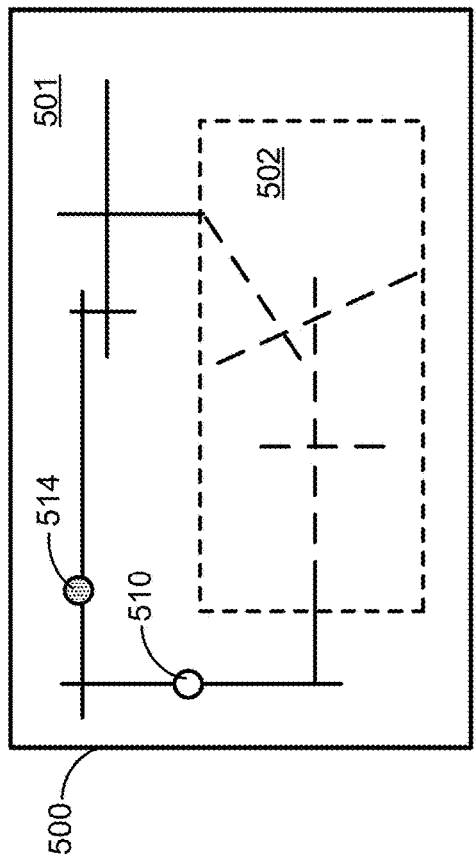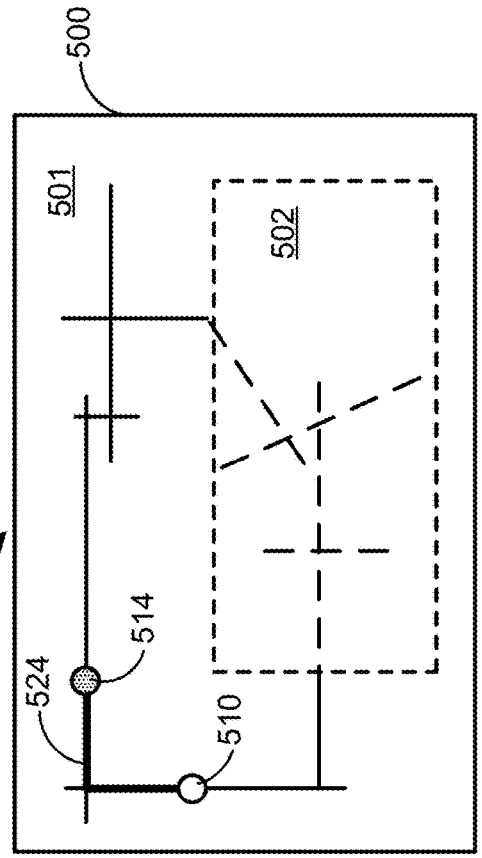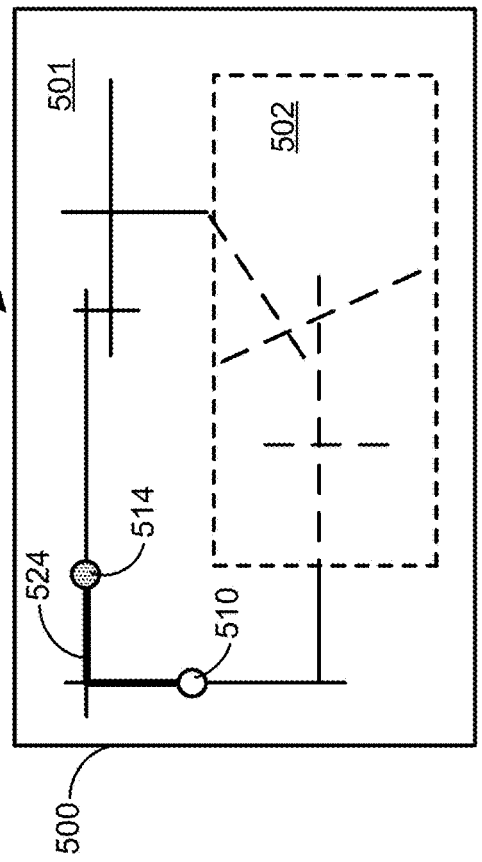

SYSTEMS AND METHODS OF GENERATING COMPOSITE ROUTING MAPS

RELATED APPLICATIONS

This application is a continuation of International Application PCT/US20/28125, filed Apr. 14, 2020, which claims priority to U.S. Prov. App. No. 62/834,898, filed Apr. 16, 2019, each of which is hereby incorporated by reference in its entirety.

TECHNICAL FIELD

The disclosed embodiments relate generally to systems and methods for generating composite maps for routing autonomous vehicles.

BACKGROUND

In the coming years, autonomous vehicle (AV) technology will overcome the present challenges in motion planning and control. For example, autonomous vehicles will be able to stay in lanes, follow cars, avoid pedestrians, and drive as well as or better than a taxi driver. Autonomous vehicles will need only to be instructed where to go and how to get there, making route planning critical in the AV world.

As developers build core autonomy technology and start to scale their fleets of self-driving or autonomous vehicles, whether for sale to individual consumers or operating their own ride-sharing fleets, these developers will need effective routing technology. The winners and losers in this race will be determined by which companies operate the most efficient networks with the highest vehicle utilization.

SUMMARY

Autonomous vehicles (AVs) are able to operate in an autonomous mode on roads and geographical areas that include high-definition (HD) information that is relevant to autonomous operation of AVs. For example, maps containing HD information may include extremely high precision accuracy (e.g., at the centimeter-level), lane information, traffic-light information, etc. HD maps are typically required for autonomous operation of AVs, which need precise instructions on how to maneuver themselves around the map space. In some embodiments, the HD information is provided with a resolution of 10 cm or less, while in other embodiments, the HD information is provided with a resolution of 5 cm or less.

However, creating an HD map that covers all geographical regions and/or roads is costly in both time and/or resources required to generate the HD map.

As maps with HD information allow vehicles to operate safely and consistently, there will be continued investment in the development and expansion of HD maps. However, HD maps can be expensive to create and limited in their geographic coverage. One way to support AV developers is to offer composite mapping, where a road map with HD information is merged into/onto a different map that may not have HD information. A routing engine can then operate on the composite (e.g., merged, combined) map, providing routes that cover geographical regions and roads that include portions that have both HD information (e.g., HD portions) as well as portions that do not have HD information (e.g., standard definition (SD) portions). However, combining two different maps can be challenging as geometries and topologies from each map do not always line up with one another.

To address this problem, the present disclosure provides systems and methods for generating a composite map for routing autonomous vehicles.

In accordance with some embodiments, a method of generating a composite map that includes both HD map data and SD map data includes identifying a first node and a source node on the HD map. The method further includes determining a candidate source node on an SD map that corresponds to the source node on the HD map. The method further includes determining a plurality of candidate nodes on the SD map that potentially correspond to the first node on the HD map. The method further includes selecting a respective candidate node, from the plurality of candidate nodes on the SD map, as corresponding to the first node of the HD map. The respective candidate node is selected based on a similarity of a routing distance between the respective candidate node on the SD map and the candidate source node on the SD map; and a routing distance between the first node on the HD map and the source node on the HD map. The method further includes generating a composite map that includes information from the HD map and the SD map.

Some embodiments of the present disclosure provide a computer system (e.g., a server system), comprising one or more processors and memory storing one or more programs. The one or more programs store instructions that, when executed by the one or more processors, cause the computer system to perform any of the methods described herein.

Some embodiments of the present disclosure provide a non-transitory computer readable storage medium storing instructions that, when executed by a computer system having one or more processors, cause the computer system to perform any of the methods described herein.

These embodiments improve autonomous vehicles by allowing autonomous vehicles to traverse a greater range (e.g., by not limiting autonomous vehicles to areas that are covered by HD maps, and instead allowing autonomous vehicles to be routed through areas in which a safety driver may need to take over). Thus, such embodiments improve the safety, utility, and energy efficiency of autonomous vehicles by enabling more efficient routing (e.g., by allowing for a more direct route and/or a safer route).

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings.

FIG. 4 is a two-dimensional birds-eye view illustrating corresponding nodes on a high-definition map and a standard definition map in accordance with some embodiments.

FIGS. 5A-5F illustrate examples of routing on a composite map in accordance with some embodiments.

DETAILED DESCRIPTION

The systems and methods described herein improve routing for AVs by creating a composite map from two different maps, one of which is an HD map that includes HD information, so that the composite map may include, in addition to the information on the HD map, information for one or more geographical regions that are not included in the HD map. By creating a composite map from two different maps, at least one of which includes HD information, the composite map allows routing of AVs through geographical regions and/or roads that may not currently be associated with HD information or may not be included in the HD map. Thus, the systems and methods described herein increase the geographic region for routing of autonomous vehicles, thereby improving the efficiency and geographical coverage of AV routing systems.

Figure 1A:
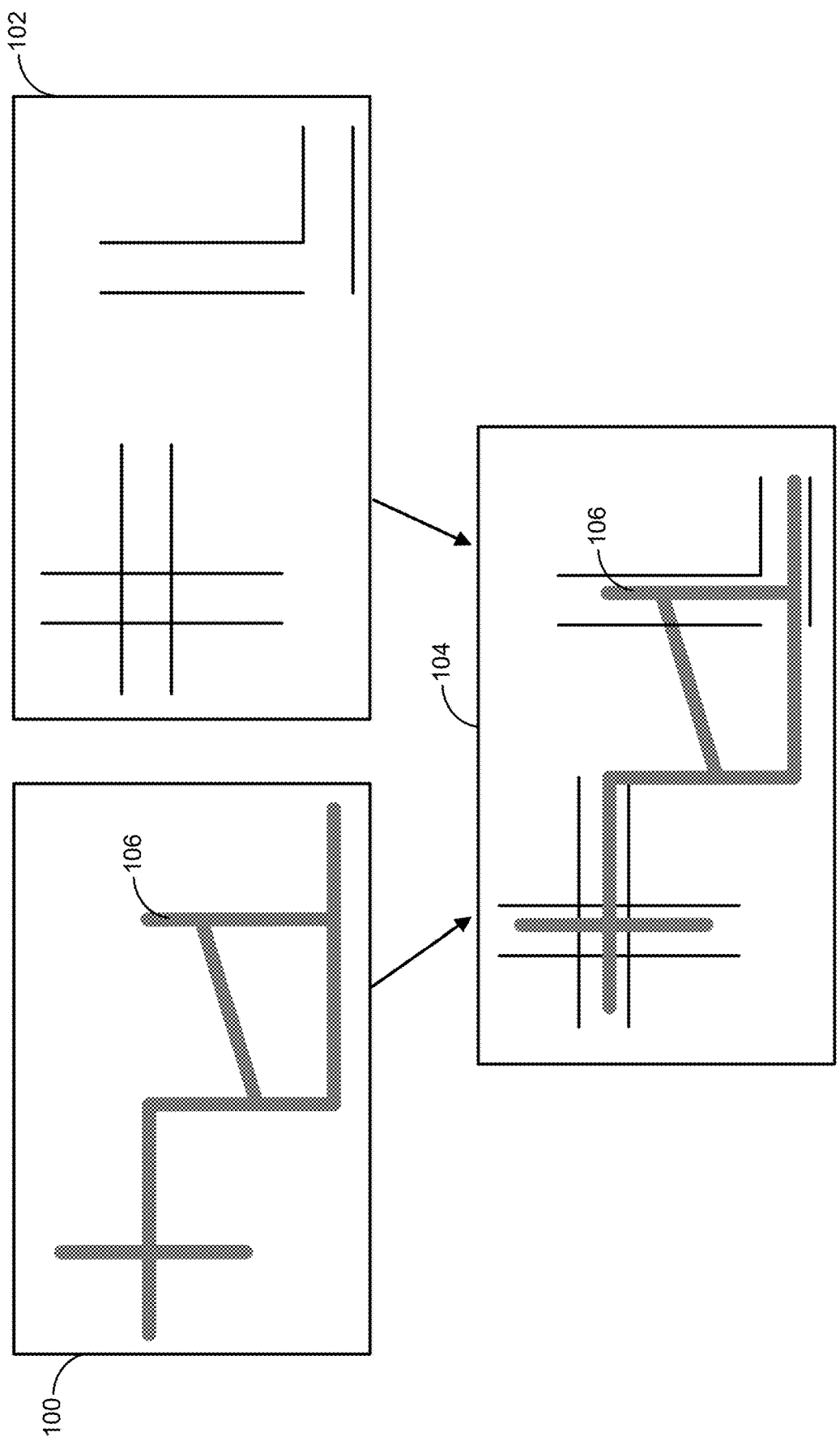
FIGS. 1A-1B illustrate a composite map generated from a high-definition map and a standard definition map in accordance with some embodiments.
Figure 1B:
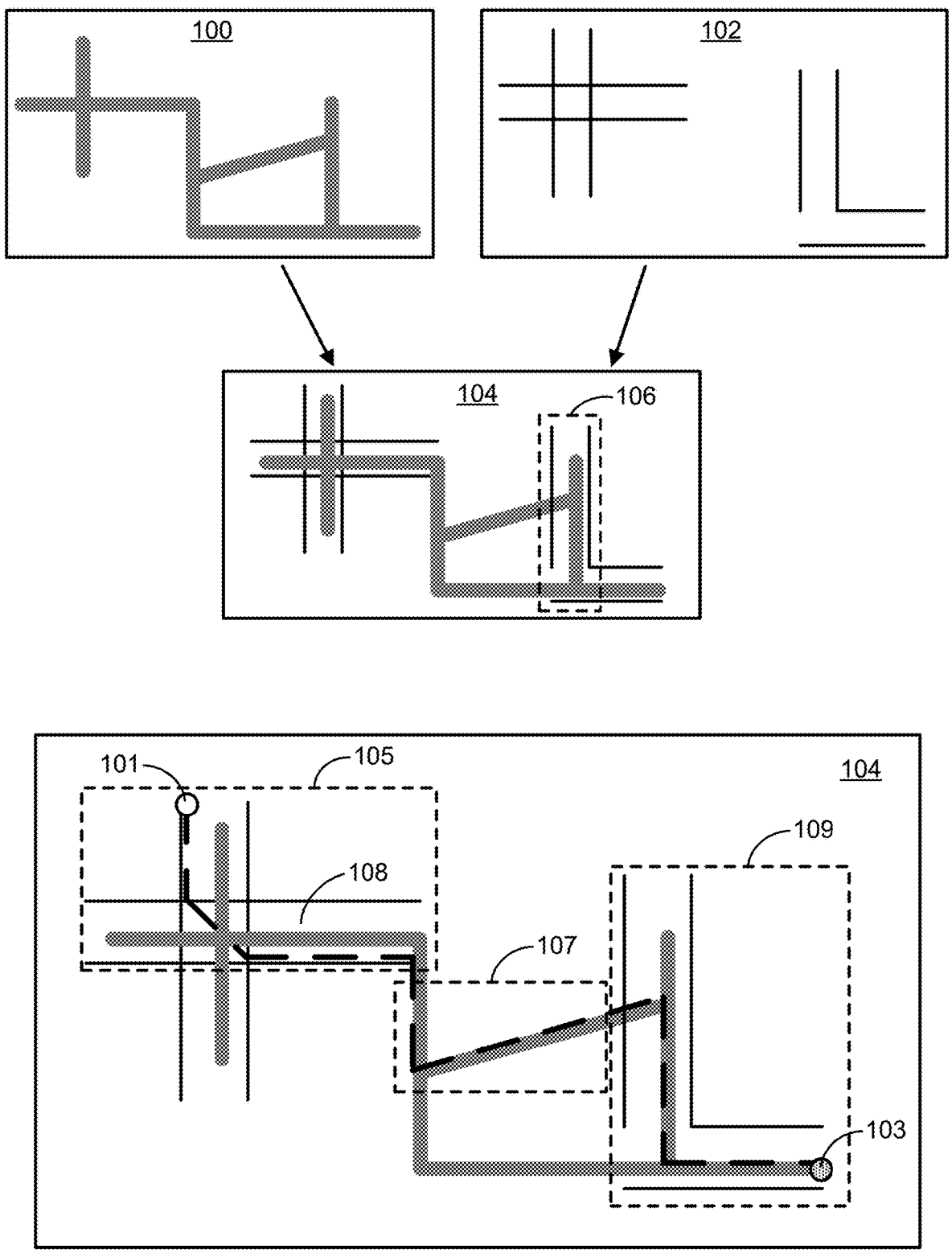

FIGS. 1A-1B illustrate a composite map generated from a high-definition map and a standard-definition map in accordance with some embodiments.

FIGS. 1A and 1B show SD map 100 (e.g., a base layer map that does not include HD information) and HD map 102 that includes HD information (e.g., lane-level information). For example, the SD map 100 includes road-level but not lane-level information. In FIGS. 1A and 1B, thick lines represent road-level information and thin lines represent lane-level information. Composite map 104 is generated from overlaying HD map 102 onto SD map 100. In some embodiments, the composite map 104 includes all the information from SD map 100, such as roads, intersections, etc., including portions of SD map 100 that may overlap with HD map 102, such as map portion 106. For example, in some embodiments, SD map 100 and HD map 102 are embodied as graphs comprising nodes and edges. In some embodiments, the composite map 104 includes all of the nodes and edges of both maps. In some circumstances, nodes may represent intersections, or any other feature of a road (e.g., lane divisions, turns, etc.)

Referring to FIG. 1B, an example of a route 108 between a first location 101 and a second location 103 on composite map 104 is shown. Route 108 requires an AV to cross-over from an HD portion 105 to an SD portion 107 and then to another HD portion 109 within composite map 104. In some embodiments, route 108 is selected in order to minimize the number of crossovers between HD and SD portions and to minimize travel distance on SD portion(s) (e.g., stay on HD portions and avoid driving on SD portions as much as possible) of composite map 104.

Figure 2A:
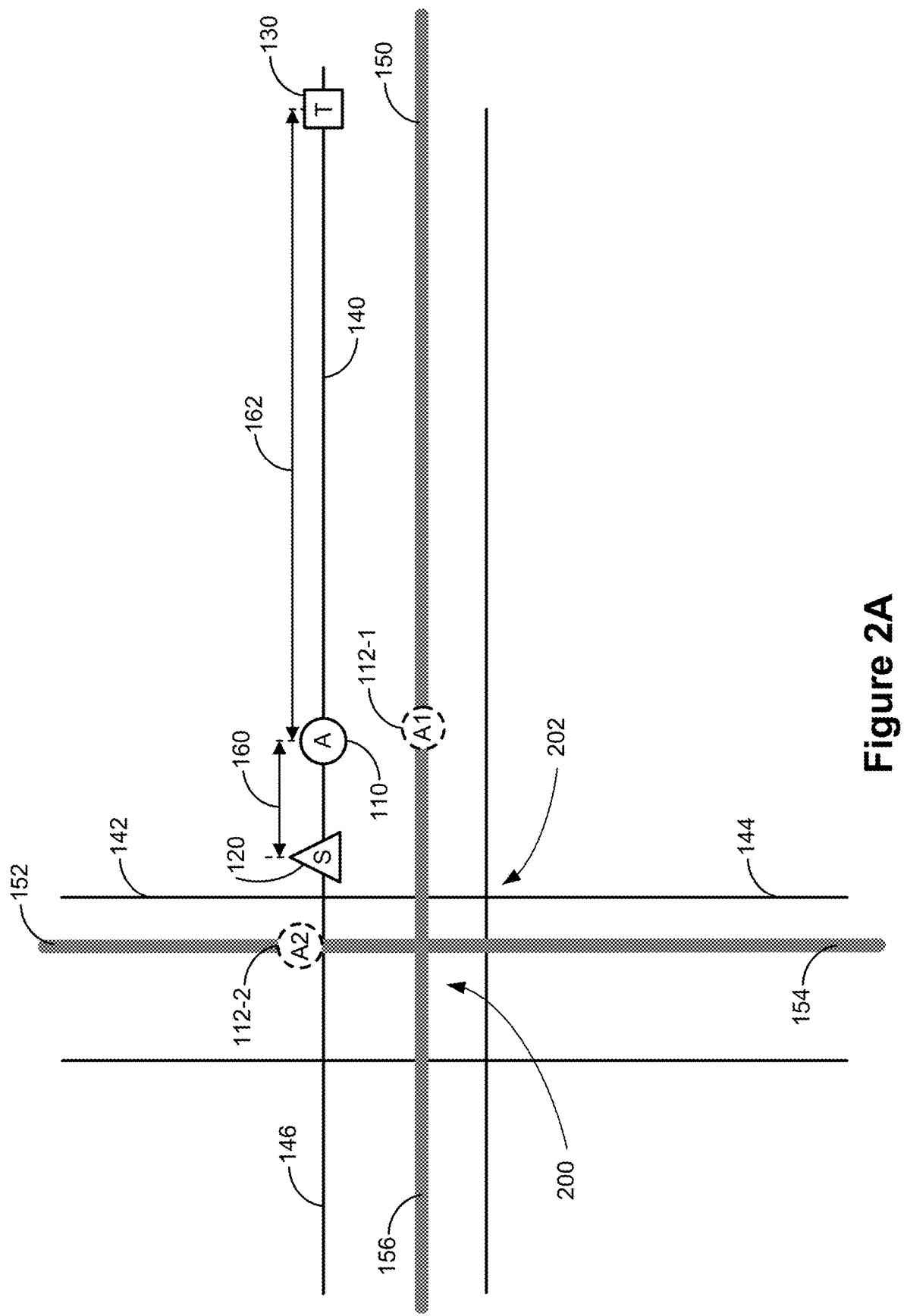
FIGS. 2A-2C show a portion of an SD map and a portion of an HD map overlaid on top of one another, in accordance with some embodiments.
Figure 2B:
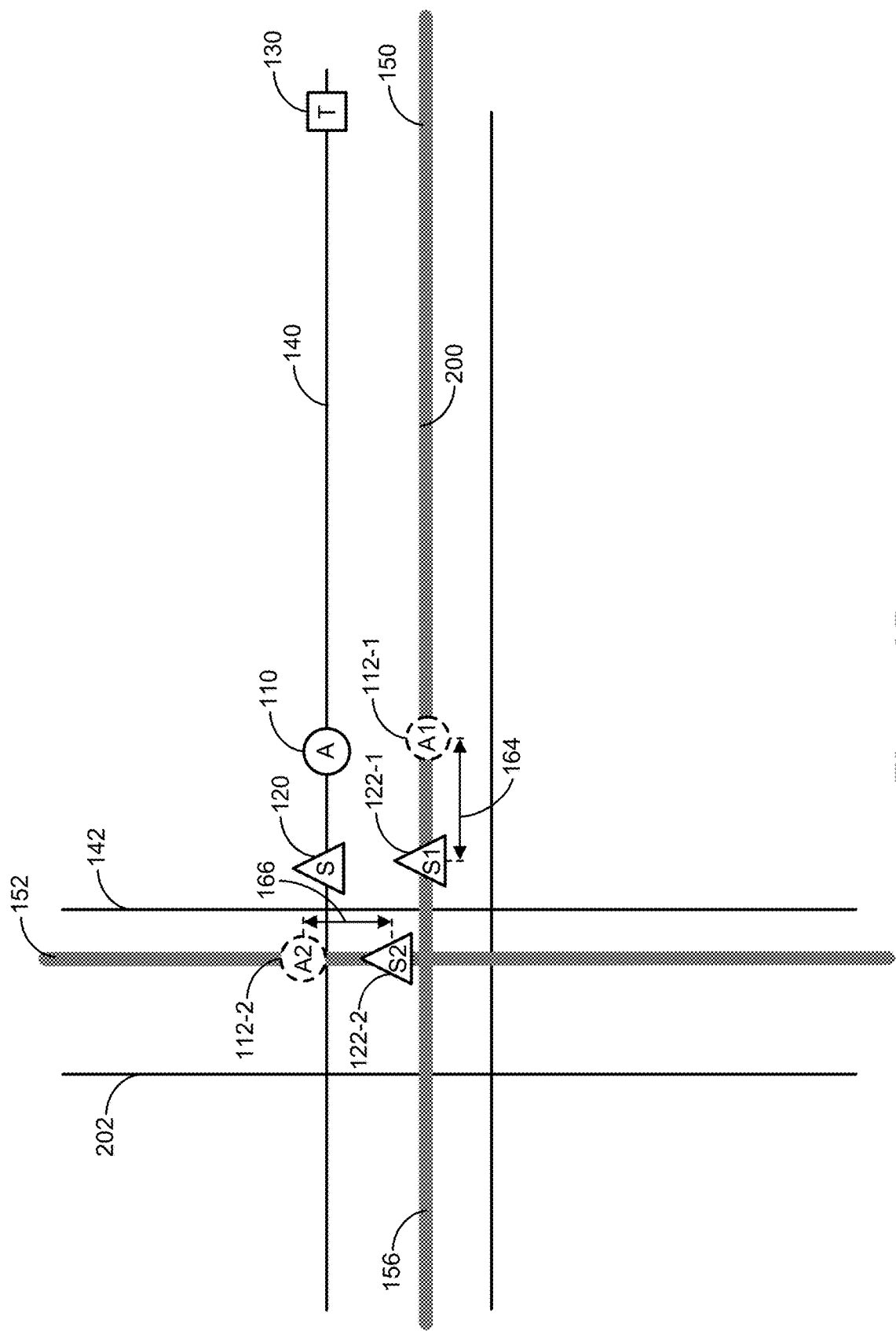
Figure 2C:
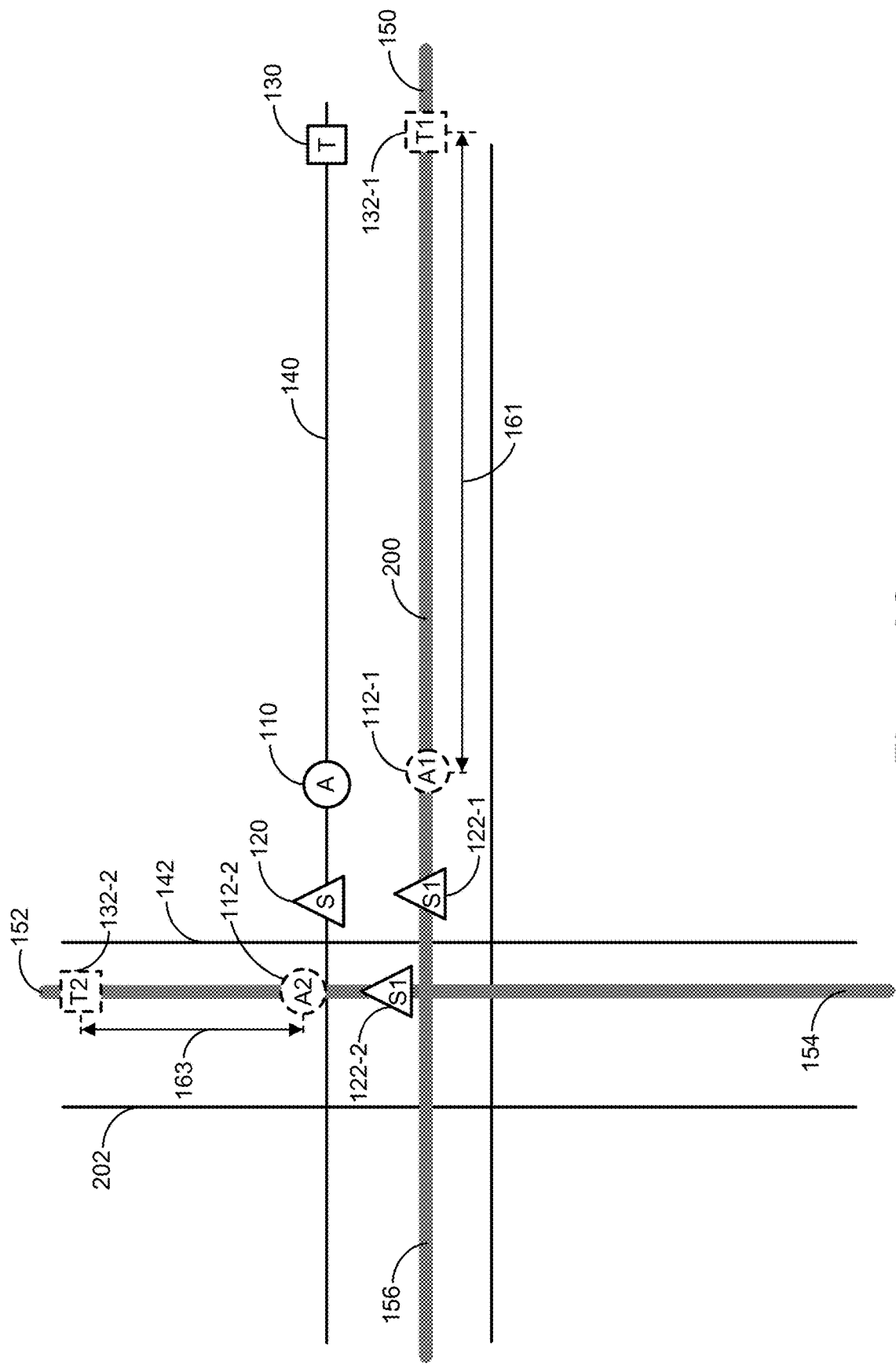

FIGS. 2A-2C show a portion of an SD map 200 and a portion of an HD map 202 overlaid on top of one another. As shown, HD map 202 has a first edge 140 (e.g., corresponding to a lane in a first road), a second edge 142 (e.g., corresponding to a lane in a second road), a third edge 144 (e.g., corresponding to a lane in a third road), a fourth edge 146 (e.g., corresponding to a lane in a fourth road). SD map 200 has a fifth edge 150 (e.g., corresponding to the first road), a sixth edge 152 (e.g., corresponding to the second road), a seventh edge 154 (e.g., corresponding to the third road), an eighth edge 156 (e.g., corresponding to the fourth road). Edges (e.g., a road or lane) may be connected to one another at one or more nodes (e.g., an intersection or lane merger). For example, although the fifth edge 150 and the eighth edge 156, may be the same "road" in human terms (e.g., "1st Avenue") these road segments are separate edges on the map because they are separated by a node (e.g., an intersection).

In order to merge the HD and SD maps, a first node 110 and a source node 120 are identified on HD map 202. As shown, first node 110 is located on first edge 140 of HD map 202. A plurality of candidate nodes 112 (e.g., A1 112-1, A2 112-2) on SD map 200 that may correspond to first node 110 are determined. In some embodiments, candidate nodes 112 did not previously exist on the SD map (e.g., candidate nodes 112 are virtual nodes generated as part of the process of generating a composite map). In some embodiments, the candidate nodes 112 on the SD map are generated based on proximity to first node 110. For example, a predefined number (e.g., 2, 4, 8) candidate nodes are generated by selecting a corresponding number of nearest edges (e.g., as the crow flies) and locating a nearest point (e.g., as the crow flies) on each of the corresponding number of nearest edges (e.g., four nearest edges are selected, and the nearest point on each of the four nearest edges is selected as a virtual node). Thus, a first candidate node 112-1 located on fifth edge 150 of SD map 200 may be a location on fifth edge 150 that is closest to or within a predetermined (e.g., threshold) distance (for example, 500 feet) of first node 110. Similarly, a second candidate node 112-2 located on sixth edge 152 of SD map may be a location on sixth edge 152 that is closest to or within a predetermined distance of first node 110.

One or more candidate source nodes (e.g., candidate source nodes 122-1 and 122-2) on SD map 200 that may correspond to source node 120 are also generated in a method that is similar to the generation of the plurality of candidate nodes (e.g., candidate nodes 112-1 and 112-2). In some embodiments, a candidate source node is a location on an edge on an SD map that is adjacent to the source node on the HD map (e.g., candidate source nodes are identified using the virtual node process described above). A first routing distance 160 on HD map 202 between first node 110 and source node 120 is determined (e.g., by making a call to a routing engine). A routing distance is a travel distance between two locations (e.g., an edge distance, a physical distance between two points that is traversed by using edges or roads). Thus, in some circumstances, a routing distance is not the same as an as-the-crow-flies distance. In some embodiments, a node (e.g., a first node, a source node, a target node) on an HD map may correspond to one or more of an intersection, a lane change, a lane merge, a lane division, or a turn.

In some embodiments, if no candidate nodes for the first node 110 are found within a predetermined or threshold distance, the first node 110 on the HD map 220 will not be assigned a corresponding node on the SD map 200. For example, this may occur when HD map 220 is a test circuit based off of a standard road network.

Referring to FIG. 2B, a routing distance between each respective candidate node 112 of the plurality of candidate nodes 112 and each respective candidate source node 122 of the one or more candidate source nodes 122 on SD map 200 are determined. For example, a second routing distance 164 between first candidate source node 122-1 and first candidate node 112-1, and a third routing distance 166 between second candidate source node 122-2 and second candidate node 112-2 is determined (e.g., calculated, measured). Although not shown, a routing distance between first candidate source node 122-1 and second candidate node 112-2 and a routing distance between second candidate source node 122-2 and first candidate node 112-1 may also be determined. The determined routing distances on SD map 200 (e.g., routing distances 164 and 166) are compared to first routing distance 160 on HD map 202. A candidate node corresponding to (having) a routing distance that is most similar to the first routing distance 160 is selected to be the anchor node.

In some embodiments, in order to determine a routing distance between two nodes on SD map 200, for example, a candidate node 112-n and a source node 122-1, a first call is made to a routing engine (e.g., AV routing engine 638) using source node 122-1 as an origin and the candidate node 112-n as a destination (or in some cases, vice versa).

In some embodiments, in order to determine a routing distance between two nodes on HD map 220, for example, first node 110 and source node 120, a second call is made to a routing engine using source node 120 as an origin and first node 110 as a destination (or in some cases, vice versa).

Further, as shown in FIG. 2C, a target node 130 may be identified on HD map 202 and one or more candidate target nodes (e.g., candidate target nodes 132-1 and 132-2) that may correspond to target node 130 may be generated on SD map 200. In such cases, a respective candidate node (e.g., first candidate node 112-1 or second candidate node 112-2) may be selected further based on a similarity in routing distance between the respective candidate node and a corresponding respective source node and a similarity in routing distance between the respective candidate node and a corresponding respective target node. For example, a fourth routing distance 162 (shown in FIG. 2A) on HD map 202 between first node 110 and target node 130 is determined. A fifth routing distance 161 between first candidate node 112-1 and first candidate target node 132-1, and a sixth routing distance 163 between second candidate node 112-2 and second candidate target node 132-2 are determined (e.g., calculated, measured). Although not shown, a routing distance between first candidate node 112-1 and second candidate target node 132-2 and a routing distance between second candidate node 112-2 and first candidate target node 132-1 may also be determined. The determined routing distances on SD map 200 (e.g., routing distances 161 and 163) are compared to fourth routing distance 162 on HD map 202. A candidate node corresponding to a routing distance that is most similar to the first routing distance 160 and a routing distance that is most similar to the fourth routing distance 162 is selected.

Figure 3:
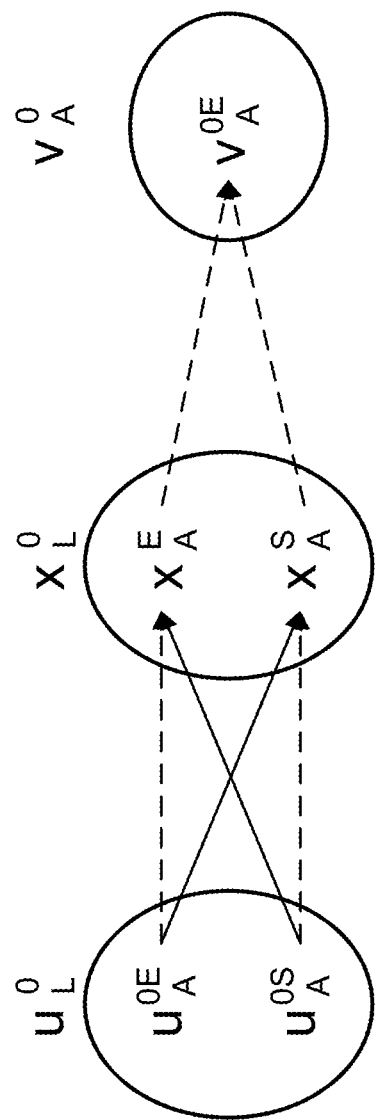
FIG. 3 is a visualization of selecting a candidate node in accordance with some embodiments.

FIG. 3 is a visualization of selecting a candidate node in accordance with some embodiments. In the example provided in FIG. 3, u represents the one or more candidate source nodes (e.g., candidate source nodes 122-1 and 122-2 on SD map 200 that potentially correspond to source node 120 on HD map 202, x represents the candidate nodes (e.g., candidate nodes 112-1 and 112-2 that potentially correspond to first node 110 on HD map 202), and v represents the one or more candidate target nodes (e.g., candidate target nodes 132-1 and 132-2 on SD map 200 that potentially correspond to target node 130 on HD map 202). The various solid and dashed arrows indicate routing distances that are determined between respective candidate source nodes, respective candidate nodes, and respective target nodes. In this example, there is only one candidate target node, $v_A^{OE}$.

In order to compare the various routing distances on the SD map to the various routing distances on the HD map, the following equation, which minimizes the sum of square differences, is used:

$$x_A^* = \operatorname{argmin} \sum_i (\min_k |d(u_A^{ik}, x_A) - d(u_L^i, x_L)|)^2 +$$

$$\sum_j (\min_k |d(x_A, v_A^{jk}) - d(x_L, v_L^j)|)^2$$

In the Equation above, $x_A^*$ is the selected candidate node (e.g., the anchor node on the composite map), $x_A$ is a candidate node (e.g., a candidate anchor node) on the SD map, $u_A^{ik}$ is a candidate source node on the SD map, $u_L^i$ is the corresponding source node on the HD map, $x_L$ is the node being matched (e.g., the first node, in method 800, FIG. 8), $v_A^{jk}$ is a candidate target node on the SD map, and $v_L^j$ is the corresponding target node on the HD map.

As an example, if the routing distance along $u_A^{OE}$, $x_A^E$, $v_A^{OE}$ is closer to the actual distances than the routing distance along $u_A^{OS}$, $x_A^S$, $v_A^{OA}$, then $x_X^E$ is selected as the anchor node. This process is repeated for all nodes in the HD map in order to creat a set of anchor nodes $\{x_A\}$.

Returning to the example shown in FIGS. 2A-2C, the second routing distance 164 between first candidate source node 122-1 and first candidate node 112-1 on SD map 200 is the most similar to first routing distance 160 on HD map 202. Additionally, fifth routing distance 161 between first candidate node 112-1 and first candidate target node 132-1 on SD map 200 is the most similar to fourth routing distance 162 on HD map 202. Thus, the first candidate node 112-1, which corresponds to both the second routing distance 164 and the fifth routing distance 161, is selected to be an anchor node, referred to hereafter as anchor node 112-1, on SD map 200 that corresponds to first node 110 on HD map 202.

In some embodiments, each node on the HD map 220 is mapped to a node on the SD map 200 using the process described above with respect to FIGS. 2A-2C and FIG. 3. In some embodiments, generating the composite map includes mapping all nodes on the HD map to respective nodes on the SD map. In some embodiments, generating the composite map includes mapping all mappable nodes on the HD map to respective nodes on the SD map.

FIG. 4 is a two-dimensional birds-eye view illustrating corresponding nodes on a high-definition map and a standard definition map in accordance with some embodiments. First node 110 is shown on HD map 220 and anchor node 112-1, corresponding to first node 110, is shown on SD map 200. In order to connect first node 110 on HD map 220 to anchor node 112-1 on SD map 200, thereby also connecting HD map 220 and SD map 200, four virtual anchor edges are created. A first virtual anchor edge 410 and a second virtual anchor edge 412 are created that connect anchor node 112-1 to SD map 200. For example, first virtual anchor edge 410 may connect anchor node 112-1 to the selected candidate source node on SD map 200 and second virtual anchor edge 412 may connect anchor node 112-1 to the selected candidate target node on SD map 200. A third virtual anchor edge 414 connects anchor node 112-1 on SD map 200 to first node 110 on HD map and a fourth virtual anchor edge 416 connects first node 110 on HD map 220 to anchor node 112-1 on SD map 200. Thus, in some embodiments, for each generated anchor node on SD map 200, four virtual anchor edges are generated. The creation of anchor nodes on SD map 200 and corresponding virtual anchor edges allows seamless routing between SD map 200 and HD map 220.

Figure 5A:
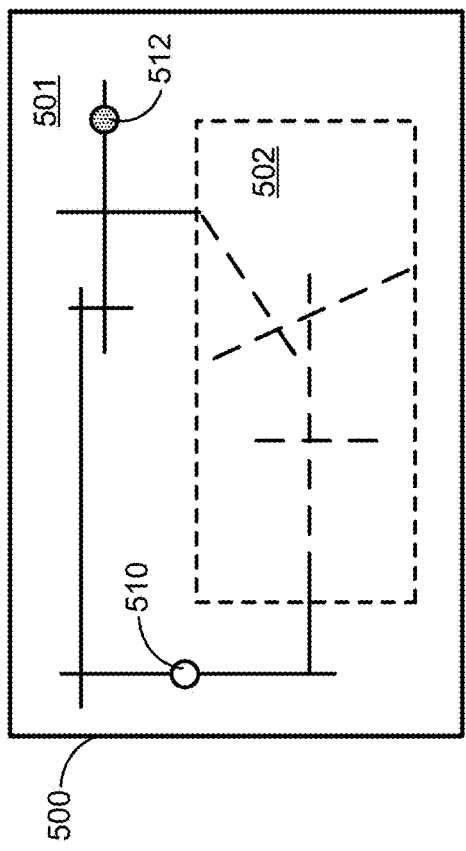

FIGS. 5A-5F illustrate examples of routing on a composite map 500 in accordance with some embodiments. As shown in FIG. 5A, composite map 500 includes an SD portion 501 and an HD portion 502. FIG. 5A also shows a first location 510 and a second location 512 on the SD portion 501 of composite map 500.

Figure 5C:
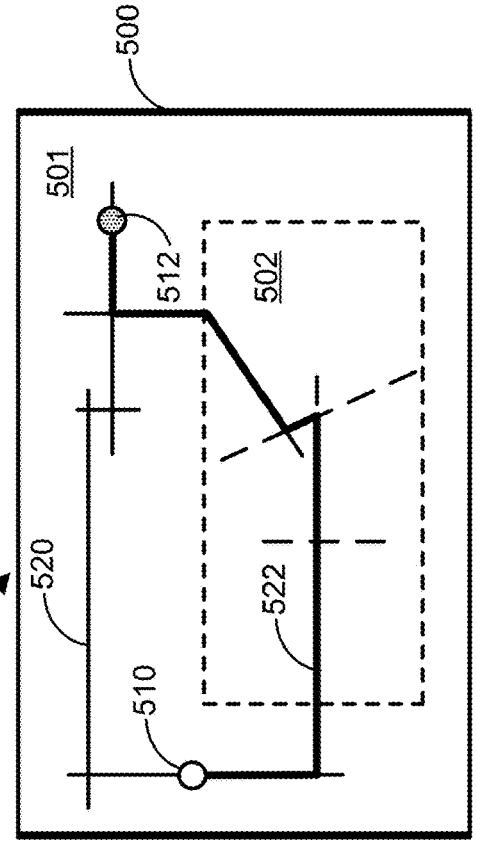
Figure 5B:
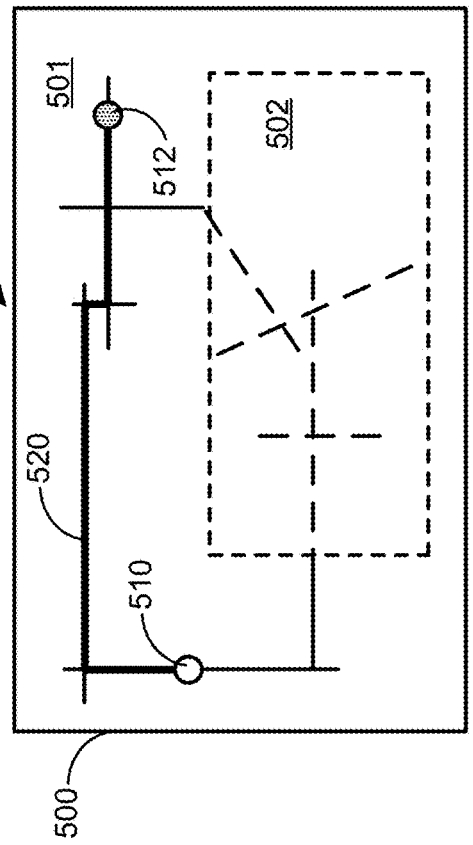

FIG. 5B illustrates a first route 520 between first location 510 and second location 512 that routes on only SD portions of composite map 500.

In some embodiments, edges (e.g., road or road segments) that were originally on the SD map, e.g., "SD edges," may be labeled with a marker or an attribute. For example, SD edges that do not overlap with edges on the HD map, e.g., "HD edges," may be labeled with an attribute "human intervention zone" to indicate that an AV may not be able to operate autonomously on these edges and that a human driver is required in order to traverse these edges (or these portions of the composite map 500). In such cases, the "human intervention zone" attribute may be used as a constraint such that a routing engine prioritizes routing on HD portions of composite map 500 as much as possible (e.g., prioritizes routing on SD portions of composite map 500 as little as possible) while still being able to handle situations where routing on the SD portion 501 is necessary in order to complete the route.

Referring to FIG. 5C, second route 522, different from first route 520, between first location 510 and second location 512 is shown. In contrast to first route 520, which does not include routing on the HD portion 502 of composite map 500, second route 522 includes routing on both SD portion 501 and HD portion 502 of composite map 500. For example, first route 520 may prioritize a minimum routing distance. In contrast, second route 522 may prioritize routing on HD portions of composite map 500 as much as possible in order to minimize the need for user intervention.

Additionally, the routing engine may also use composite map 500 in conjunction with constraints (e.g., prioritizes routing on HD portions of composite map 500) to handle situations where it may not make sense to route through HD portions of composite map 500. FIG. 5D shows first location 510 and a third location 514 located on SD portion 501 of composite map 500. FIG. 5E, shows a third route 524 between first location 510 and third location 514 that only includes SD portions of composite map 500. For example, a routing engine may use only an SD map, prioritize routing distance or be constrained to prioritize routing on SD portions of composite map 500, resulting in the generation of third route 524.

Alternatively, the routing engine may be configured to prioritize routing on HD portions of composite map 500 as described above. However, in this case, it would not make sense for a vehicle to route through HD portions of composite map 500. Thus, despite applying the constraint to prioritize routing on HD portions of composite map 500, the routing engine may generate third route 524 as the preferred or recommended route (the route 524 shown in FIG. 5F is the same as the route 524 shown in FIG. 5E).

Figure 6A:
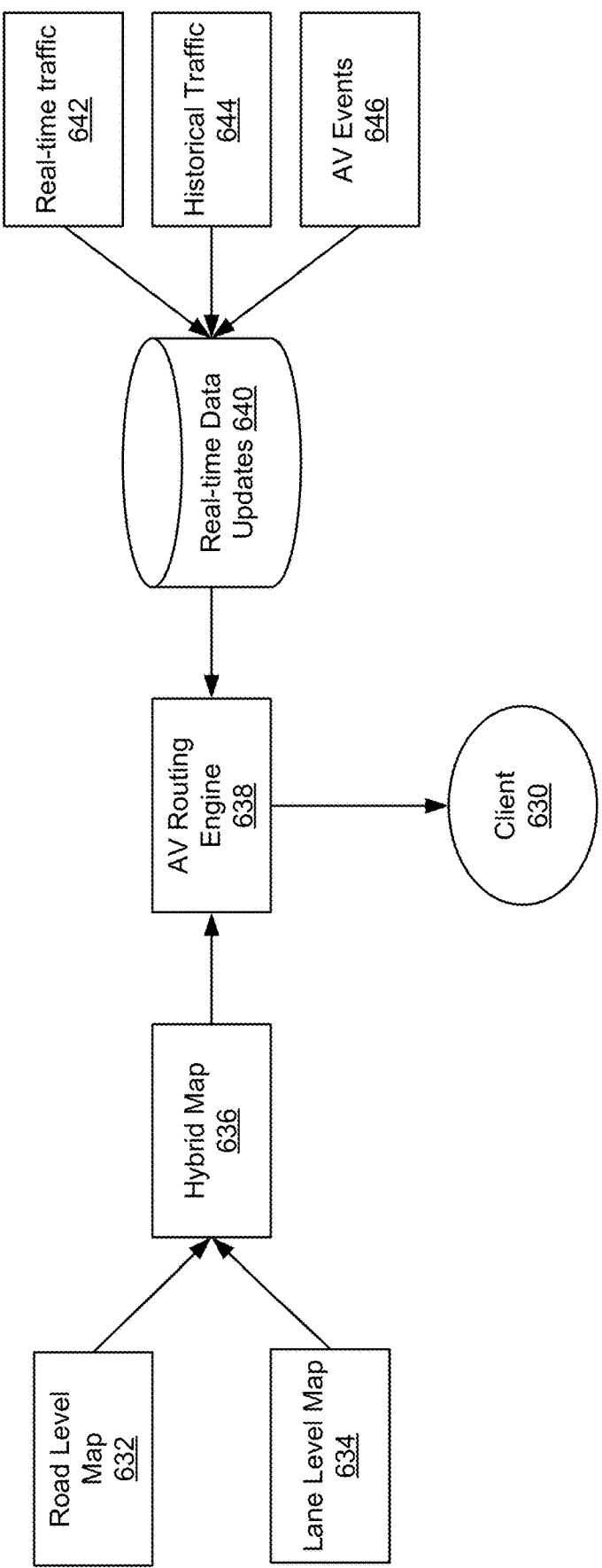
FIGS. 6A-6B are block diagrams illustrating an architecture of an autonomous vehicle routing engine, in accordance with some embodiments.

FIG. 6A is an example of an architecture of an autonomous-vehicle routing engine, in accordance with some embodiments. For example, the client 630 is the autonomous vehicle to be routed or an electronic device associated with the autonomous vehicle.

Real-time data updates 640 include a server system that receives and/or tracks real-time traffic 642, historical traffic 644, and AV Events 646 and processes and forwards the traffic and events to AV Routing Engine 638, such that AV Routing Engine 638 can create and/or update a route for client 630. The AV Routing Engine 638 also uses information received from hybrid map 636 (e.g., a composite map, as discussed above) (e.g., which is based on road level map 632 (e.g., an SD map) and lane level map 634 (e.g., an HD map) to create/update the route for client 630.

Figure 6B:
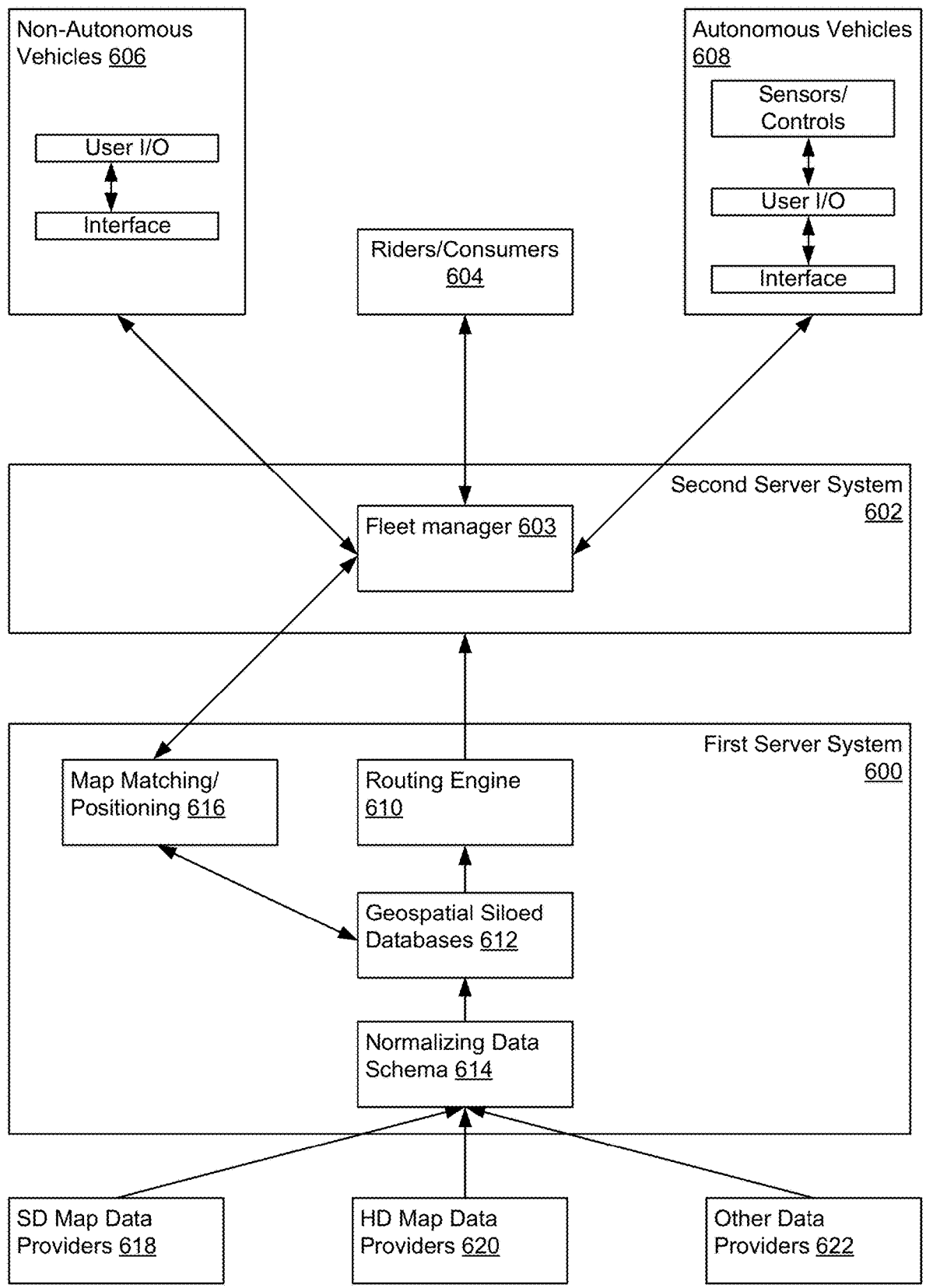

FIG. 6B illustrates another exemplary architecture (e.g., a so-called "stack") for a fleet of vehicles. The features of the exemplary architecture shown in FIG. 6B may optionally complement, replace, or be combined with the features of the architecture described with respect to FIG. 6A. In some embodiments, the fleet of vehicles is a mixed fleet of vehicles including autonomous vehicles (e.g., autonomous vehicles 608) and non-autonomous vehicles (e.g., non-autonomous vehicles 606). In some circumstances, a fleet includes a mix of different vehicle types (e.g., automobiles, bicycles, scooters, and/or delivery robots). In some circumstances, the fleet provides services to riders (e.g., riders/consumers 604) by transporting riders from a first location to a second location. In some circumstances, the fleet provides services to other consumers, e.g., by delivering items to the consumers (e.g., delivering meals from restaurants, delivering packages from retail stores).

To facilitate the provision of these services using a mixed fleet of vehicles, the stack includes a first server system 600 that provides fleet management services and routing information. The first server system 600 includes one or more processors (e.g., CPUs) and memory storing instructions for the modules described with reference to the first server system (e.g., the map matching/positioning module 616, the routing engine 610, the geospatial siloed databases 612, and the normalizing data schema 614). The first server system 600 interfaces with a fleet manager 603 on a second server system 602. In the exemplary architecture shown in the figure, the second server system 602 acts as a client of the first server system 600, while riders, consumers (e.g., riders/consumers 604), and vehicles (e.g., non-autonomous vehicles 606 and/or autonomous vehicles 608) act as clients of the second server system 602.

In some embodiments, the second server system 602 is a separate and distinct server system from the first server system 600. The second server system 602 includes one or more processors (e.g., CPUs) and memory storing instructions for the modules described with reference to the second server system 602 (e.g., the fleet manager 603). The instructions are executed by the one or more processors. In some circumstances, the fleet manager 603 is one of a plurality of fleet managers serviced by the first server system 600. For example, the fleet manager 603 may be a fleet manager for a specific company's fleet, and the first server system 600 may provide services to multiple companies' fleets.

The first server system 600 includes a routing engine 610 that provides routes, distances, and estimated times of arrival for autonomous vehicles 608 and non-autonomous vehicles 606. In some embodiments, a different instance of the routing engine is instantiated for each fleet.

The first server system includes one or more geospatial siloed databases 612 storing geospatial data (e.g., data stored with a corresponding geographical location, such as latitude and longitude). The geospatial siloed databases 612 include "standard definition" (SD) map data received from SD map data providers (e.g., data such as streets locations/geometries, street names). An example of an SD Map Data Provider is OpenStreetMap. In some embodiments, the geospatial data further includes "high definition" data such as lane-level data (e.g., lane locations/geometries, information about which maneuvers are permitted from which lanes) received from HD map data providers. The geospatial data further includes data from other data providers, such as information received from municipalities about construction and road closures, real-time data, traffic data and other data.

In addition, the geospatial siloed databases 612 store locations (e.g., map matched locations) of the vehicles in the various fleets.

In some embodiments, the geospatial siloed databases 612 store a plurality of distinct instances of data covering the same geographical region. For example, the geospatial siloed databases 612 store multiple maps (e.g., with geospatial data overlaid on those maps) covering the same region. In some circumstances, the different maps will include data appropriate to a specific fleet's vehicles (e.g., a fleet will include autonomous vehicles and delivery bots, and the geospatial siloed databases will store one or more maps with information appropriate to the fleet's vehicle types). Some instances of the map may be public to any client (e.g., any fleet manager), while other versions of the map may be private to certain clients (e.g., certain fleet managers). For example, a respective fleet may license data from a respective HD map data provider. The data provided by the respective HD map data provider are thus siloed and private to the respective fleet's fleet manager (e.g., fleet manager 603).

In some embodiments, the data ingested from the various data sources (e.g., the SD map data providers 618, the HD map data providers 620, the other data providers 622) are normalized by a normalizing data schema 614. The normalizing data schema 614 translates data from a plurality of first formats to a normalized second format that is independent of the first format (e.g., independent of the source of the data).

The first server system 600 further includes a map matching/positioning module 616 that matches location data received from vehicles to a map location (e.g., a location of a map stored in the geospatial siloed databases 612). For example, some vehicles generate location data (e.g., GPS data or data from another positioning system, such as GLONASS, Galileo, or BeiDou). In some circumstances, this data is noisy and may place the vehicle away from its actual location, e.g., on a sidewalk or in a building. The map matching/positioning module 616 receives the location data from a respective vehicle (e.g., through the fleet manager 603, which interfaces with the first server system 600), matches the noisy location data to a probable road location and/or lane location and updates the "map matched" location of the vehicle in the geospatial siloed databases 612 (e.g., updates the matched position). In addition, the map matched position is provided to the fleet manager 603 for various purposes (e.g., monitoring the fleet).

As noted above, the stack includes a second server system 602, optionally distinct and separate from the first server system 600. The second server system 602 includes the fleet manager 603, which acts as a client of the first server system 600 (e.g., a client of the routing engine). The fleet manager 603 dispatches vehicles (e.g., non-autonomous vehicles 606 and/or autonomous vehicles 608), assigns routes to vehicles, and assigns staging locations to vehicles within its corresponding fleet (e.g., using information and routes provided by the routing engine). In addition, the fleet manager 603 interfaces with riders/consumers 604 (e.g., via a mobile application on the rider's smartphone or other device). The fleet manager 603 provides information such as estimated times of arrival (ETAs) and trip costs to the riders/consumers 604 via their mobile devices. In some embodiments, the fleet manager 603 also receives data such as vehicle positions (e.g., location, including optionally lane-specific location and orientation (e.g., which way the vehicle is pointing)) from the individual vehicles.

In some embodiments, an autonomous vehicle includes an AV platform which serves as an operating system and framework for the autonomous functionality of the autonomous vehicle. The autonomous vehicle includes one or more processors (e.g., CPUs) and memory storing instructions for the modules described with reference to the autonomous vehicle (e.g., the interface module, the AV platform, drivers for the sensors/controls). The instructions are executed by the one or more processors. An example of an AV platform is the open source Robotics Operating System. The fleet manager (e.g., fleet manager 603) interacts with the autonomous vehicles (e.g., autonomous vehicles 608) through an interface module, which is a module that runs on the AV platform to provide routes to the AV platform and receive data from the autonomous vehicle's sensors. For example, in some circumstances, the interface module is provided by the developer of the routing engine to act as a liaison between the first server system and the robotics of the autonomous vehicle. The AV platform receives sensor data from the autonomous vehicles sensor's and, in some circumstances, makes the sensor data available to the fleet manager, which can make the sensor data available further down the stack, for example, to the map matching/position module. In some embodiments, the AV platform sends commands to the autonomous vehicle's controls (e.g., acceleration commands, breaking commands, turning commands, etc.) through a drive-by-wire system.

Figure 7:
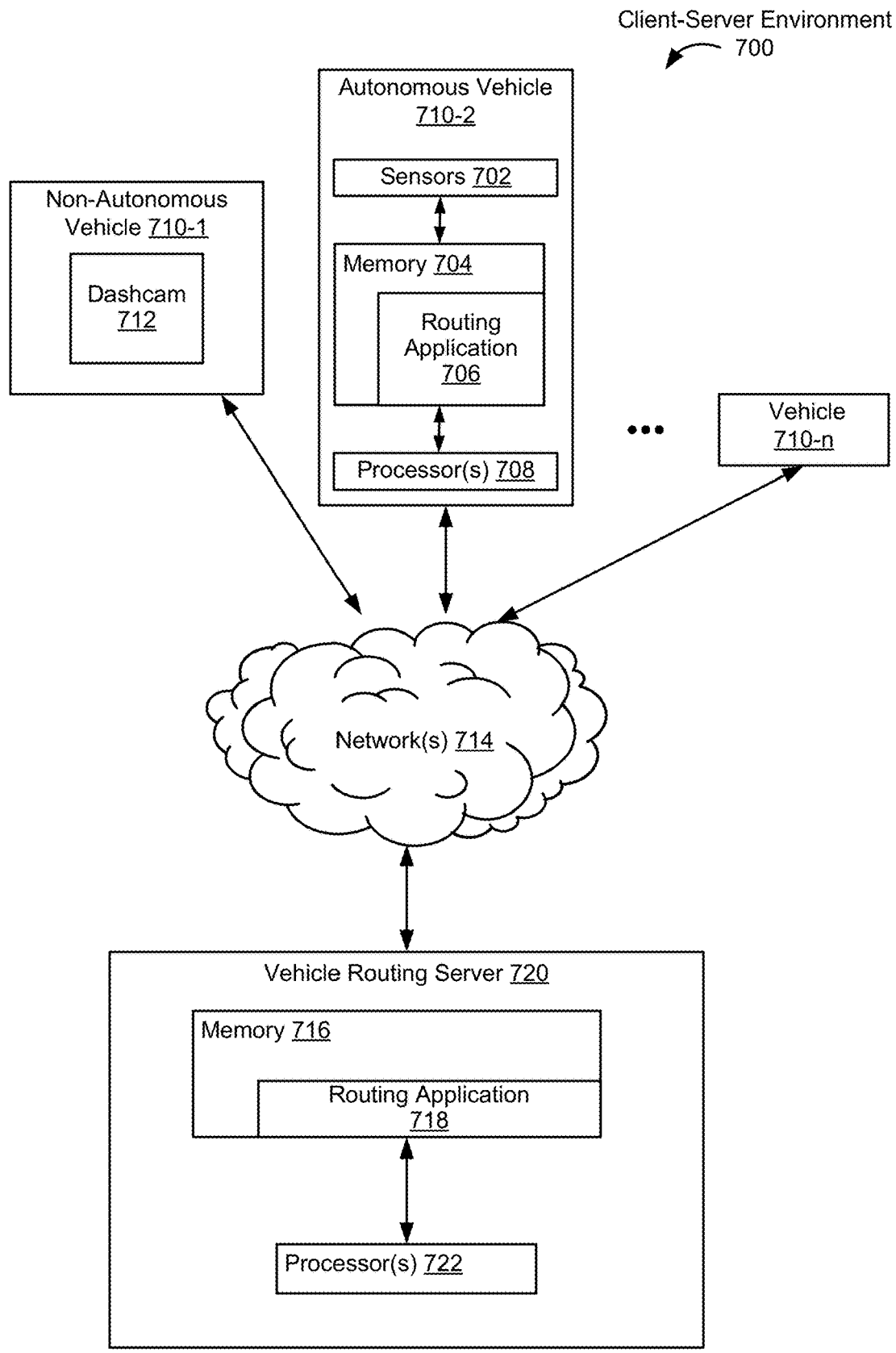
FIG. 7 is a block diagram illustrating a client-server environment, in accordance with some embodiments.

FIG. 7 is a block diagram of a client-server environment 700 in accordance with some embodiments. The client-server environment 700 includes vehicles 710 (e.g., 710-1, 710-2, ..., 710-n) that are connected to a vehicle routing server 720 through one or more networks 714. In some embodiments, vehicles 710 are or are analogous to vehicles 606/608 (FIG. 6B). In some circumstances, the vehicles 710 operate as clients of vehicle routing server 720. The one or more networks 714 can be any network (or combination of networks) such as the Internet, other Wide Area Networks, Local Area Networks, metropolitan area networks, VPNs, peer-to-peer, ad-hoc connections, and so on.

The non-autonomous vehicle 710-1 is a representative human-driven vehicle (e.g., a car, truck, or motorcycle). In some embodiments, non-autonomous vehicle 710-1 is or is analogous to non-autonomous vehicle 606 (FIG. 6B) In some embodiments, non-autonomous vehicle 710 includes a dashcam 712 that acquires and sends camera images to vehicle routing server 720, which can automatically identify road conditions from the dashcam images (as well as from autonomous vehicle camera sensor data from autonomous vehicles, such as from sensors 702 in autonomous vehicle 710-2).

The autonomous vehicle 710-2 (e.g., a car, truck, or motorcycle) includes non-transitory memory 704 (e.g., non-volatile memory) that stores instructions for one or more client routing applications 706. In some embodiments, autonomous vehicle 710-2 is or is analogous to autonomous vehicle 608 (FIG. 6B) Client routing applications 706 are executed by one or more processors (e.g., CPUs) 708 on the autonomous vehicle 710-2. In some embodiments, the client routing applications 706 send requests for routes to the vehicle routing server 720 and receive selected routes from the vehicle routing server 720. In some embodiments, the client routing applications 706 direct the autonomous vehicles 710-2 along the selected routes. Client routing applications 706 may be embodied as any appropriate combination of programs, firmware, operating systems, or other logical or physical aspects of the autonomous vehicle 710-2. Autonomous vehicle 710-2 also optionally includes one or more network interfaces and one or more communication buses for interconnecting these components. Autonomous vehicle 710-2 further includes vehicle components, such as an engine/motor, a steering mechanism, lights, signaling mechanisms, etc., some or all of which may be under the control of programs (e.g., a client routing application 706) stored in memory 704.

In some circumstances, a fleet of vehicles e.g., up to vehicle 710-*n*) is in communication with vehicle routing server 720. The fleet may be a mix of autonomous and human driven vehicles or may be entirely autonomous.

Vehicle routing server 720 includes non-transitory memory 716 (e.g., non-volatile memory) that stores instructions for one or more server routing applications 718 (sometimes referred to as "routing engines"). Vehicle routing server 720 further includes one or more processors (e.g., CPUs) 722 for executing server routing applications 718. Server routing applications 718 may be embodied as any appropriate combination of programs, firmware, operating systems, or other logical or physical aspects of the autonomous vehicle 710-2. Vehicle routing server 720 also optionally includes one or more network interfaces and one or more communication buses for interconnecting these components.

The above-identified applications correspond to sets of instructions for performing functions described herein. The applications need not be implemented as separate software programs, procedures, or modules, and thus various subsets of these instructions may be combined or otherwise re-arranged in various embodiments.

Figure 8:
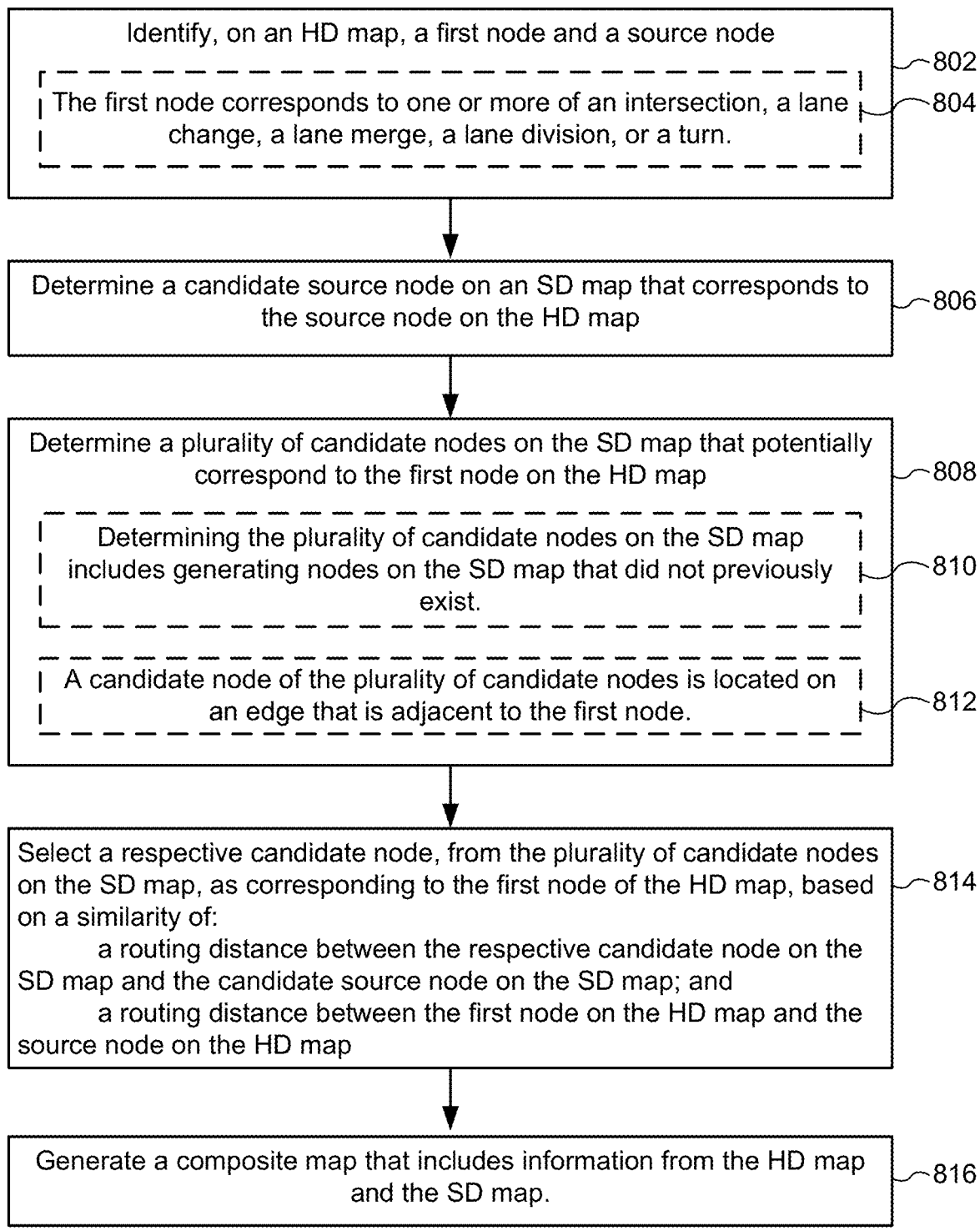
FIG. 8 is a flowchart of a method for generating a composite map, in accordance with some embodiments.

FIG. 8 is a flow chart of a method 800 of generating a composite map, in accordance with some embodiments. In some embodiments, the composite map generated by method 800 includes both high-definition (HD) map data and standard definition (SD) map data. In some embodiments, the composite map includes an HD portion (e.g., corresponding to a geographical area for which the composite map includes HD information and, optionally, SD information) and an SD portion (e.g., corresponding to a geographical area for which the composite map includes only SD information (e.g., the composite map covers at least one geographic area that includes an SD information and does not include an HD information).

In some embodiments, the method 800 generates the composite map by combining information from an HD map and information from an SD map to enable routing between the HD portion of the composite map and the SD portion of the composite map. For example, in some circumstances, an autonomous vehicle will operate in an autonomous mode when routed through geographical areas covered by the HD map, but will require a safety driver to take over when routed through geographical areas covered only by the SD map. However, combining the HD map and the SD map into a single composite map simplifies autonomous vehicle routing and expands the capabilities of autonomous vehicles (e.g., allows autonomous vehicles to be routed through a larger area).

The method 800 is performed at an electronic device (e.g., vehicle routing server 720, FIG. 7). While the following discussion describes implementations where the vehicle routing server 720 performs the steps of the method 800, in other embodiments, one or more (e.g., all) of the steps are performed by another electronic device, such as vehicle 710-2 (e.g., a computer system on vehicle 710-2 with non-transitory memory storing instructions for executing the method and one or more processors for executing the instructions) or a server system distinct from the vehicle routing server 720 (e.g., a dedicated map generating server). Moreover, some operations in method 800 are, optionally, combined and/or the order of some operations is, optionally, changed. In some embodiments, some or all of the operations of method 800 are performed automatically, without human intervention.

Method 800 includes identifying (802) on an HD map a first node (e.g., node 110, FIG. 2A) and a source node (e.g., node 120, FIG. 2A). In some embodiments, the first node corresponds to one or more of an intersection, a lane change, a lane merge, a lane division, or a turn.

Method 800 further includes determining (804) a candidate source node on an SD map (e.g., any node 122, FIG. 2B) that corresponds to the source node on the HD map.

Method 800 further includes determining (806) a plurality of candidate nodes (e.g., nodes 112, FIG. 2B) on the SD map that potentially correspond to the first node on the HD map. In some embodiments, determining the plurality of candidate nodes on the SD map includes (810) generating nodes on the SD map that did not previously exist (e.g., generating virtual nodes). In some embodiments, a candidate node of the plurality of candidate nodes is located (812) on an edge that is adjacent to the first node (e.g., virtual nodes are created at the nearest location on a predefined number of nearest edges).

Method 800 further includes selecting (814) a respective candidate node, from the plurality of candidate nodes on the SD map, as corresponding to the first node of the HD map, based on a similarity of: a routing distance between the respective candidate node on the SD map and the candidate source node on the SD map; and a routing distance between the first node on the HD map and the source node on the HD map. In some circumstances, the selected candidate node is referred to as an anchor node on the composite map. In some embodiments, method 800 further includes generating anchor edges connecting the anchor node to the first node on the HD map and to the source and target nodes on the SD map. In some embodiments, generating the composite map includes generating an edge (e.g., an anchor edge in the composite map) between the first node on the HD map and the selected candidate node on the SD map. The edge connects the first node on the HD map to the selected candidate node on the SD map. The composite map includes the edge connecting the first node on the HD map to the selected candidate node on the SD map.

In some embodiments, selecting the respective candidate node includes selecting the candidate node with a minimum of the squares of differences between the routing distances on the SD map and the HD map. Stated another way, the anchor node is selected based on routing distance similarity between the SD maps and HD maps.

In some embodiments, the method 800 further includes determining the routing distance between the respective candidate node on the SD map and the source node on the SD map by making a first call to a routing engine (e.g., routing engine 638, FIG. 6A and/or routing engine 610, FIG. 6B) using the source node on the SD map as an origin and the respective candidate node as a destination. Method 800 further includes determining the routing distance between the first node on the HD map and the source node on the HD map by making a second call to the routing engine using the source node on the HD map as an origin and the first node as a destination.

Method 800 further includes generating (816) a composite map that includes information from the HD map and the SD map. In some embodiments, the composite map includes the anchor nodes and/or anchor edges.

In some embodiments, method 800 includes identifying a target node (e.g., node 130, FIG. 2B) on the HD map and determining a candidate target node on the SD map (e.g., any node 132, FIG. 2C) that corresponds to the target node on the HD map. The respective candidate node on the SD map is further selected based on a similarity of: a routing distance between the respective candidate node on the SD map and the candidate target node on the SD map; and a routing distance between the first node on the HD map and the target node on the HD map.

In some embodiments, the source node on the HD map, the first node on the HD map, and the target node on the HD map correspond to a same physical road or road segment. For example, the source node may represent one end of a road, the target node may represent an opposite end of the road, and the first node may represent a lane split in the road.

In some embodiments, the source node, the target node and the first node are located on a same edge of the HD map. In some embodiments, the source node is an initial node of the edge (e.g., in terms of travel for the routing request) the target node is a terminal node of the edge (e.g., in terms of travel for the routing request).

In some embodiments, the method 800 includes determining a plurality of candidate source nodes on the SD map that potentially correspond to the source node on the HD map and selecting the source node on the SD map from the plurality of candidate source nodes on the SD map as corresponding to the source node on the HD map based on the similarity of the routing distance between the respective candidate node on the SD map and the source node on the SD map.

In some embodiments, the method 800 includes determining a plurality of candidate target nodes on the SD map that potentially correspond to the target node on the HD map and selecting the target node on the SD map from the plurality of candidate target nodes on the SD map as corresponding to the target node on the HD map based on the similarity of the routing distance between the respective candidate node on the SD map and the target node on the SD map.

Thus, in some embodiments, the anchor node, the corresponding source node, and the corresponding target node on the SD map are all selected from a plurality of corresponding candidates based on a similarity of the overall routing distance from the source (origin) to the target (destination).

In some embodiments, method 800 includes mapping each node of the HD map to a node of the SD map (e.g., each node of on the HD map is mapped to the SD map according to method 800).

Some embodiments of the present disclosure provide methods for generating composite maps from a first map and a second map, without regard to whether the first map and the second map are HD maps or SD maps. Such methods may be analogous to method 800, except that the first map need not be an HD map and the second map need not be an SD map. For example, in some embodiments, the first map and the second map are both HD maps. In some embodiments, the first map is a base map and the second map is an auxiliary map (or vice versa). In some embodiments, both maps are SD maps. In some embodiments, the first map and the second map include different information for the same geographical area. For example, in some embodiments, the method includes identifying on a first map a first node and a source node. The method includes determining a candidate source node on a second that corresponds to the source node on the first map. The method further includes determining a plurality of candidate nodes on the second map that potentially correspond to the first node on the first map. The method further includes selecting a respective candidate node, from the plurality of candidate nodes on the second map, as corresponding to the first node of the first map, based on a similarity of: a routing distance between the respective candidate node on the second map and the candidate source node on the second map, and a routing distance between the first node on the first map and the source node on the first map. The method further includes generating a composite map that includes information from the first map and the second map.

It will also be understood that, although the terms "first," "second," etc. are, in some circumstances, used herein to describe various elements, these elements should not be limited by these terms. These terms are only used to distinguish one element from another. For example, a first vehicle could be termed a second vehicle, and, similarly, a second vehicle could be termed a first vehicle, which changing the meaning of the description, so long as all occurrences of the "first vehicle" are renamed consistently and all occurrences of the second vehicle are renamed consistently. The first vehicle and the second vehicle are both vehicles, but they are not the same vehicle (e.g., the second vehicle is an additional vehicle).

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" is, optionally, construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative embodiments. For purposes of explanation, numerous specific details were set forth in order to provide an understanding of various embodiments of the inventive subject matter. It will be evident, however, to those skilled in the art that embodiments of the subject matter are, optionally, practiced without these specific details. In general, well-known instruction instances, protocols, structures and techniques have not been shown in detail.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best use the embodiments and various embodiments with various modifications as are suited to the particular use contemplated.

What is claimed is:

1. A method of generating a composite map for routing autonomous vehicles, the composite map including both high-definition (HD) map data and standard definition (SD) map data, the method comprising:
   identifying, on an HD map, a first node and a source node;
   determining a candidate source node on an SD map that corresponds to the source node on the HD map; and
   determining a plurality of candidate nodes on the SD map that potentially correspond to the first node on the HD map;
   selecting a respective candidate node, from the plurality of candidate nodes on the SD map, as corresponding to the first node of the HD map, based on a similarity of:
      a routing distance between the respective candidate node on the SD map and the candidate source node on the SD map; and
      a routing distance between the first node on the HD map and the source node on the HD map;
   generating a composite map that includes information from the HD map and the SD map, and
   routing an autonomous vehicle from a first location to a second location using the composite map.

2. The method of claim 1, further including:
   identifying a target node on the HD map;
   determining a candidate target node on the SD map that corresponds to the target node on the HD map,
   wherein the respective candidate node on the SD map is further selected based on a similarity of:
      a routing distance between the respective candidate node on the SD map and the candidate target node on the SD map; and
      a routing distance between the first node on the HD map and the target node on the HD map.

3. The method of claim 2, wherein the source node on the HD map, the first node on the HD map, and the target node on the HD map correspond to a same physical road.

4. The method of claim 2, wherein:
   the source node, the target node and the first node are located on a same edge;
   the source node is an initial node of the edge; and
   the target node is a terminal node of the edge.

5. The method of claim 2, further including:
   determining a plurality of candidate source nodes on the SD map that potentially correspond to the source node on the HD map; and
   selecting the source node on the SD map from the plurality of candidate source nodes on the SD map as corresponding to the source node on the HD map based on the similarity of the routing distance between the respective candidate node on the SD map and the source node on the SD map.

6. The method of claim 5, further including:
   determining a plurality of candidate target nodes on the SD map that potentially correspond to the target node on the HD map; and
   selecting the target node on the SD map from the plurality of candidate target nodes on the SD map as corresponding to the target node on the HD map based on the similarity of the routing distance between the respective candidate node on the SD map and the target node on the SD map.

7. The method of claim 1, wherein a candidate node of the plurality of candidate nodes is located on an edge that is adjacent to the first node.

8. The method of claim 1, wherein selecting the respective candidate node includes selecting the candidate node with a minimum difference between the routing distances on the SD map and the HD map.

9. The method of claim 1, wherein selecting the respective candidate node includes selecting the candidate node with a minimum of the squares of differences between the routing distances on the SD map and the HD map.

10. The method of claim 1, wherein determining the plurality of candidate nodes on the SD map includes generating nodes on the SD map that did not previously exist.

11. The method of claim 1, including:
    determining the routing distance between the respective candidate node on the SD map and the source node on the SD map by making a first call to a routing engine using the source node on the SD map as an origin and the respective candidate node as a destination; and
    determining the routing distance between the first node on the HD map and the source node on the HD map by making a second call to the routing engine using the source node on the HD map as an origin and the first node as a destination.

12. The method of claim 1, including mapping each node of the HD map to a node of the SD map.

13. The method of claim 1, wherein the first node corresponds to one or more of an intersection, a lane change, a lane merge, a lane division, or a turn.

14. The method of claim 1, wherein generating the composite map includes:
    generating an edge between the first node on the HD map and the selected candidate node on the SD map, the edge connecting the first node on the HD map to the selected candidate node on the SD map, wherein the composite map includes the edge connecting the first node on the HD map to the selected candidate node on the SD map.

15. The method of claim 1, wherein the composite map includes an HD portion and an SD portion.

16. The method of claim 15, wherein generating the composite map includes combining the HD map and the SD map to enable routing between the HD portion of the composite map and the SD portion of the composite map.

17. The method of claim 1, wherein the composite map covers at least one geographic area that includes an SD portion and does not include an HD portion.

18. A computer system, comprising:
    one or more processors; and
    memory storing one or more programs, the one or more programs storing instructions that, when executed by the one or more processors, cause the one or more processors to:
       identify, on an HD map, a first node and a source node;
       determine a candidate source node on an SD map that corresponds to the source node on the HD map; and
       determine a plurality of candidate nodes on the SD map that potentially correspond to the first node on the HD map;
       select a respective candidate node, from the plurality of candidate nodes on the SD map, as corresponding to the first node of the HD map, based on a similarity of:
          a routing distance between the respective candidate node on the SD map and the candidate source node on the SD map; and a routing distance between the first node on the HD map and the source node on the HD map;

generate a composite map that includes information from the HD map and the SD map; and route an autonomous vehicle from a first location to a second location using the composite map.

19. A non-transitory computer readable storage medium storing instructions that, when executed by a computer system having one or more processors, cause the computer system to:

identify, on an HD map, a first node and a source node;

determine a candidate source node on an SD map that corresponds to the source node on the HD map; and determine a plurality of candidate nodes on the SD map that potentially correspond to the first node on the HD map;

select a respective candidate node, from the plurality of candidate nodes on the SD map, as corresponding to the first node of the HD map, based on a similarity of:

a routing distance between the respective candidate node on the SD map and the candidate source node on the SD map; and a routing distance between the first node on the HD map and the source node on the HD map;

generate a composite map that includes information from the HD map and the SD map; and route an autonomous vehicle from a first location to a second location using the composite map.

* * * * *